(12) United States Patent
Popovich et al.

(10) Patent No.: US 12,373,395 B2
(45) Date of Patent: Jul. 29, 2025

(54) AVOIDING DIRECTORY CONTENTION IN DISTRIBUTED FILESYSTEM REPLICATION

(71) Applicant: Dell Products L.P., Round Rock, TX (US)

(72) Inventors: Evgeny Popovich, Port Coquitlam (CA); Oliver Chung, Bellevue, WA (US); Austin Voecks, Bainbridge Island, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 91 days.

(21) Appl. No.: 18/191,536

(22) Filed: Mar. 28, 2023

(65) Prior Publication Data

US 2024/0330247 A1 Oct. 3, 2024

(51) Int. Cl.
*G06F 16/182* (2019.01)
*G06F 16/178* (2019.01)

(52) U.S. Cl.
CPC ................. *G06F 16/1844* (2019.01)

(58) Field of Classification Search
CPC .. G06F 16/185; G06F 16/182; G06F 16/1844; G06F 16/178; G06F 16/184
See application file for complete search history.

(56) References Cited

U.S. PATENT DOCUMENTS

| | | | |
|---|---|---|---|
| 6,327,584 B1 * | 12/2001 | Xian | G06F 16/1873 |
| 8,086,638 B1 * | 12/2011 | Stacey | G06F 16/119 |
| | | | 707/791 |
| 11,960,510 B2 * | 4/2024 | Popovich | G06F 16/183 |
| 2003/0084368 A1 * | 5/2003 | Sprunt | G06F 11/1435 |
| | | | 714/E11.136 |
| 2004/0111390 A1 * | 6/2004 | Saito | G06F 11/1435 |

(Continued)

FOREIGN PATENT DOCUMENTS

| | | | | |
|---|---|---|---|---|
| CN | 111596930 A | * | 8/2020 | G06F 8/63 |
| CN | 107341227 B | * | 12/2020 | G06F 16/148 |

OTHER PUBLICATIONS

Shvachko K; "The Hadoop Distributed File System" 2010 IEEE 26th symposium on mass storage systems and technologies (MSST) (Year: 2010).*

(Continued)

*Primary Examiner* — Dennis Truong
(74) *Attorney, Agent, or Firm* — Amin, Turocy & Watson, LLP

(57) ABSTRACT

The described technology is generally directed towards replicating a filesystem namespace from a source system such as a source node cluster to a target system such as a target node cluster. Directory transfer tasks processed at the source are sent to the target build a replica of a hierarchical namespace on a target cluster, in which the namespace contains the directories and files, with the file content temporarily absent. Files transfer tasks processed at the source are sent to the target to write the content into the files, generally after namespace creation is complete. Directory transfer is recursive, as one directory transfer task creates another directory transfer task for each of its child directories, and can be concurrent and sent as bulk transfer requests for efficiency in reducing overall latency overhead. File content transfer can transfer the content of multiple small files in a single transfer task request.

20 Claims, 12 Drawing Sheets

(56) References Cited

U.S. PATENT DOCUMENTS

| | | | |
|---|---|---|---|
| 2004/0172421 A1* | 9/2004 | Saito | G06F 16/1834 |
| 2008/0134163 A1* | 6/2008 | Golde | G06F 9/4486 |
| | | | 711/E12.001 |
| 2014/0068202 A1* | 3/2014 | Goddard | G06F 21/62 |
| | | | 711/E12.001 |
| 2016/0292179 A1* | 10/2016 | Von Muhlen | G06F 16/176 |
| 2019/0392053 A1* | 12/2019 | Chalakov | G06F 16/185 |
| 2020/0336455 A1* | 10/2020 | Chalakov | G06F 16/137 |
| 2021/0109896 A1* | 4/2021 | Shemer | G06F 11/1471 |
| 2021/0132811 A1* | 5/2021 | Puvvada | G06F 16/273 |
| 2023/0119364 A1* | 4/2023 | Wang | G06F 11/0757 |
| | | | 707/626 |
| 2023/0409559 A1* | 12/2023 | Kashi Visvanathan | |
| | | | G06F 16/185 |

OTHER PUBLICATIONS

A. Ghobadi, E. H. Mahdizadeh, Y. L. Kee, L. K. Wei and M. H. Ghods, "Pre-processing directory structure for improved RSYNC transfer performance," 13th International Conference on Advanced Communication Technology (ICACT2011), Gangwon, Korea (South), 2011, pp. 1043-1048. (Year: 2011).*

* cited by examiner

AVOIDING DIRECTORY CONTENTION IN DISTRIBUTED FILESYSTEM REPLICATION

BACKGROUND

Enterprises perform data replication for various reasons, including to safeguard their data against temporary or permanent data loss, as well as to ensure continuous availability of the data for business operations. When performing a dataset replication (in contrast to an incremental replication that modifies an existing replica dataset with updates), many distributed filesystem replication engines transfer datasets by concurrently transferring files and directories from a source system to a target system.

In general, to transfer (copy) a file to the target system, such as arranged as a group of clustered nodes, a corresponding file is first created (or opened with a "CREATE" flag set) on the target system and then written into. During such a replication process, there is a high chance that multiple files/directories/symbolic links and the like are being created at the same time inside the same directory instance on the target system. Typically, filesystems have strong consistency guarantees around directory content and use directory locking mechanisms to provide the strong consistency guarantees.

As a result, concurrent create operations on the same directory are often serialized in many implementations, negatively impacting performance of parallel file transfers to a significant extent. For example, with namespace-heavy customer datasets (e.g., on the order of billions of files), data transfer workers can be doing namespace operations in the same directory via different target nodes, causing lock contention in the target directories being actively worked. These operations cause noticeable performance degradation during a data replication procedure, including replication performance degradation as well as client access degradation.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards concurrently transferring (copying to create a replica filesystem dataset) a filesystem namespace including file representations (e.g., files temporarily devoid of file content) and directories in a manner that overcomes the file creation serialization problem, thereby improving concurrency and performance of replication engines. In one example implementation as described herein, a filesystem namespace including a directory's immediate children (any child files and directories) is replicated on a target cluster, and so on for immediate children of the child directory(ies), to hierarchically build the namespace before transferring file content. The namespace transfer (and file content, when later transferred) can be accomplished in a distributed way among multiple nodes. In one example implementation, the file content is not transferred until after replication of the namespace is complete, and by doing so avoids the directory locks contention problem on the target system, without introducing any new bottlenecks.

It should be understood that any of the examples herein are non-limiting. As one example, the technology is generally described herein in a distributed node cluster environment, however this is only an example, and the technology can be implemented in similar environments. As another example, the replication described herein uses a snapshot (representing a point-in-time state) of a source cluster filesystem for transferring data to a target cluster system. Thus, any of the embodiments, aspects, concepts, structures, functionalities or examples described herein are non-limiting, and the technology may be used in various ways that provide benefits and advantages in data storage and computing in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

One or more embodiments subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
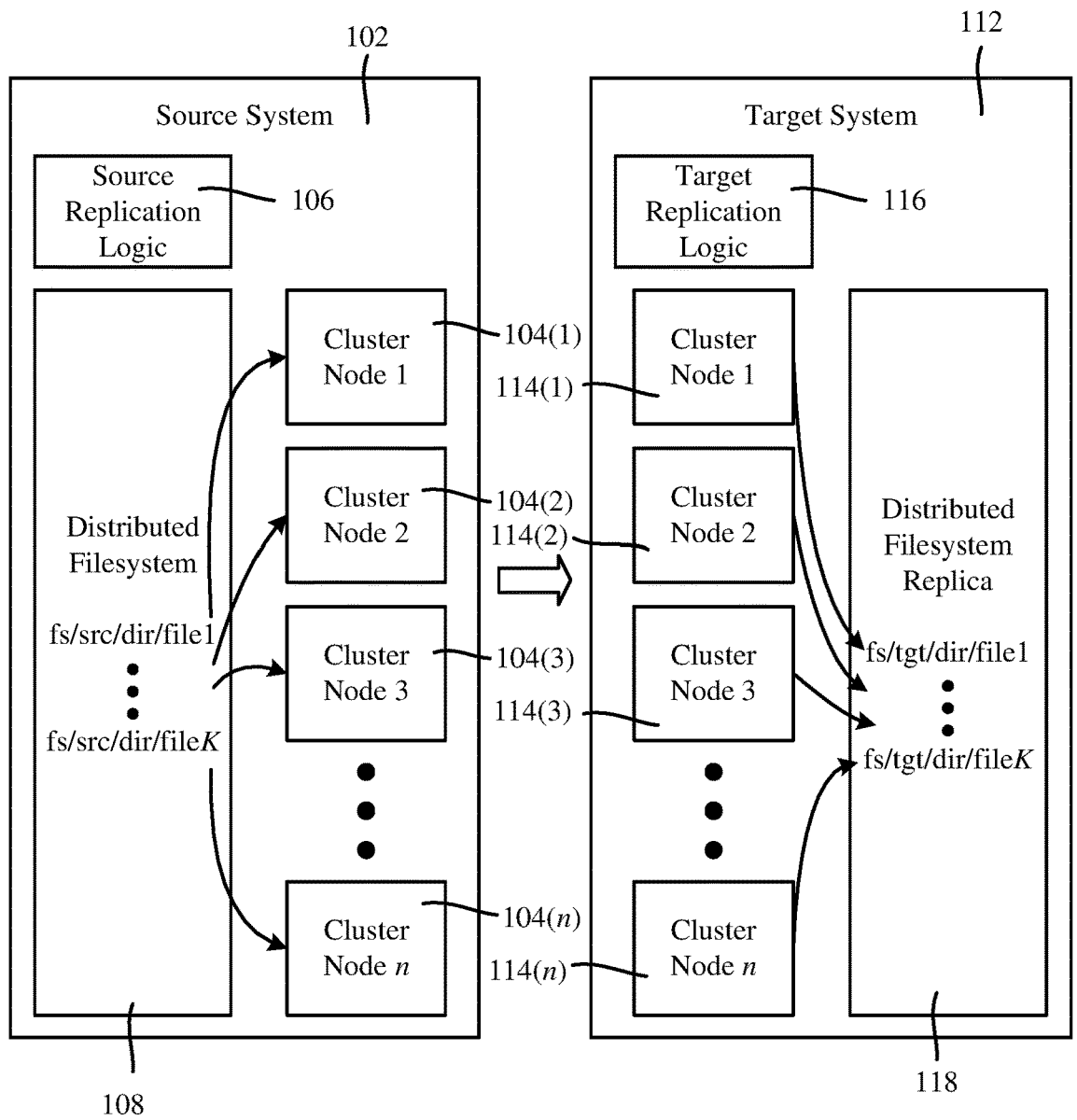
FIG. 1 is a block diagram of an example source cluster and target cluster in which replication of a filesystem of the source cluster to the target cluster is accomplished, in accordance with various aspects and implementations of the subject disclosure.

FIG. 1 is a block diagram of an example replication of a filesystem ("fs/") or other namespace (such as part of a larger filesystem) in accordance with one or more embodiments described herein. In one implementation, the source filesystem to be replicated is a snapshot of a filesystem (or namespace part thereof) that has captured the state of the filesystem at a certain point in time; in this way, the actual namespace of files and directories can continue to be accessed/modified by client users after the snapshot time. Alternatives to snapshots can be used in other systems.

FIG. 1 shows a source system 102 comprising a cluster of nodes 104(1)-104(n), along with source replication logic 106 that in general operates as described herein, e.g., to select source nodes for performing tasks. In the example of FIG. 1, the filesystem is a distributed filesystem 108, that is, distributed among the nodes typically according to some data protection scheme.

FIG. 1 also shows a target system 112 comprising a cluster of nodes 114(1)-114(n), along with target replication logic 116 that in general also operates as described herein, e.g., to select target nodes to handle requests. In the example of FIG. 1, the filesystem is a distributed filesystem 118, that is, distributed among the nodes 114(1)-114(n), again typically according to some data protection scheme. Note that the number of nodes among which the filesystem is distributed need not be the same in the source system 102 and the target system 104.

Further note that in general, the source replication logic 106 replicates data (directories, filenames and file content) from any source node to any target node, e.g., via directory and file "read" type operations, and thus without considering how the source nodes actually have distributed the data among each source node and/or storage unit. Similarly, via create operations and write operations or the like, the replication logic at the target need not consider how the target nodes are configured to distribute the data to be maintained among the target nodes. It should be noted however, that one source node may execute the source replication logic 106, although (at least some of) the source replication logic 106 may be distributed among the source nodes 104(1)-104(n). Similarly, one target node may execute the target replication logic 116, although (at least some of) the target replication logic 116 may be distributed among the target nodes 114(1)-114(n).

Wherever the source replication logic 106 executes, each of the source nodes 104(1)-104(n) can be selectively chosen by the source replication logic 106 to perform a replication-related task as described herein, e.g., that the tasks are balanced or otherwise distributed among the source nodes 104(1)-104(n). For example, round-robin selection, random selection, pseudorandom selection, selection based on current node load and so on may be used to distribute the tasks. Similarly, each of the target nodes 114(1)-114(n) can be selectively chosen by the target replication logic 116 (wherever executing) to handle replication-related requests as described herein so that received requests (corresponding to tasks) are balanced or otherwise distributed among the target nodes 114(1)-114(n).

Figure 2:
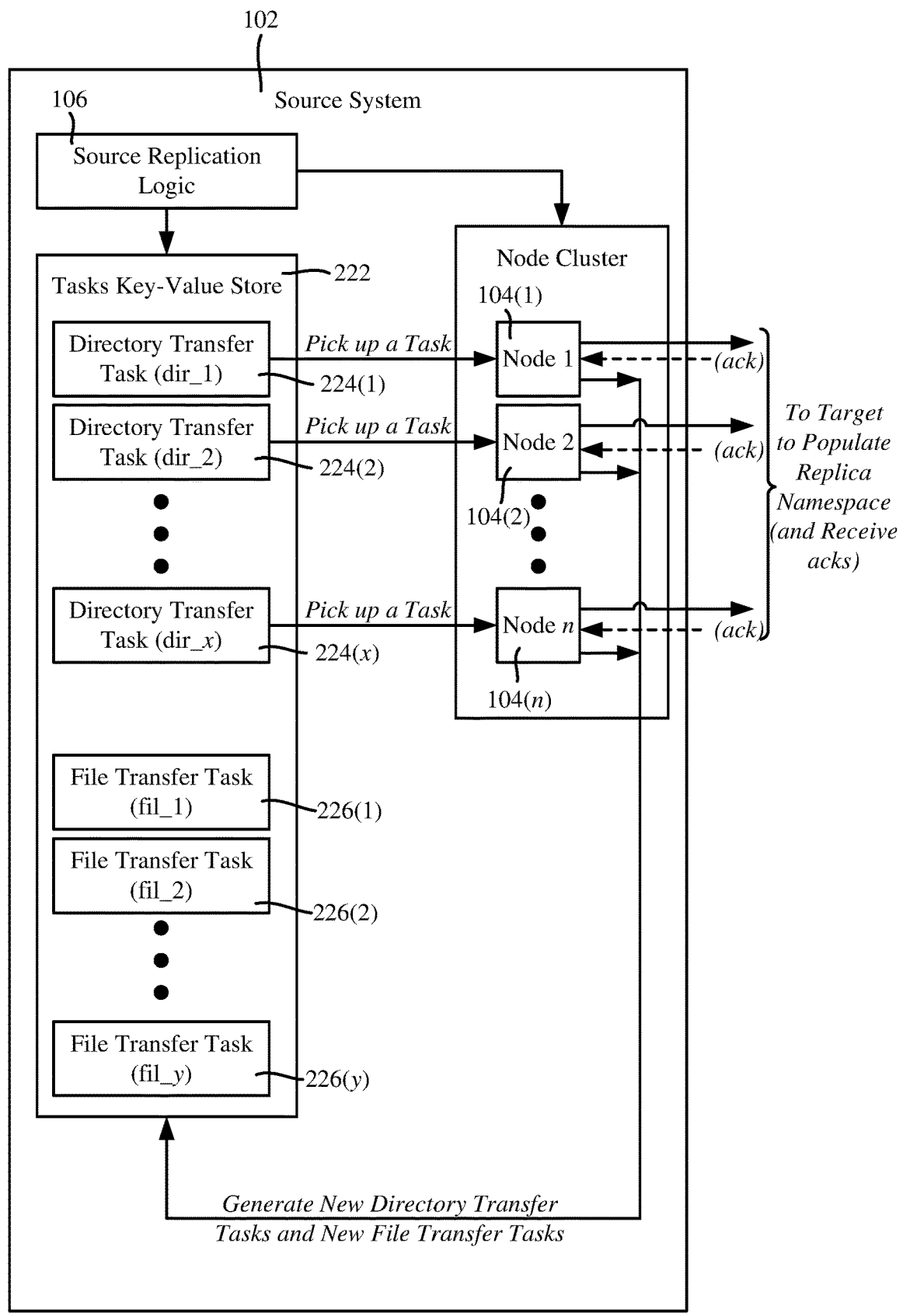
FIG. 2 is a block diagram of an example source cluster in which replication tasks including directory transfer tasks and file transfer tasks are generated to replicate a filesystem to a target cluster, in accordance with various aspects and implementations of the subject disclosure.

FIG. 2 is another example block diagram showing a tasks key-value store 222 (or other suitable data structure) that maintains the tasks and corresponding task identifiers by which a completed task may be acknowledged. Note that there can be separate data structures/key-value stores for data transfer tasks and file transfer tasks.

In general, a task is a sequential unit of work that can be assigned for execution to any source cluster node. Multiple tasks can be executed concurrently, and tasks can create other tasks. Note however that although tasks can execute concurrently, consideration needs to be given to the order of executing tasks (the sequence of the sequential units of work) for those tasks that are dependent on completion of a previous task; for example, a task to create a subdirectory under a parent directory will result in a failed operation when received and handled on the target system if the parent directory has not yet been created on the target system. In one implementation, a subsequent task is created only when the prerequisites for that task are met, whereby the order of executing tasks is not an issue.

In FIG. 2, each of the source nodes 104(1)-104(n), e.g., as selected by the source replication logic 106, pick up and handle a directory transfer task, shown as directory transfer tasks 224(1)-224(x). A directory transfer task creates a directory namespace on the target before transferring content by requesting that the target system create immediate children (empty files and directories) of the directory being transferred. For any immediate child directory (e.g., a subdirectory), a new directory transfer task is created, one directory transfer task per child directory, with such new tasks, for example, appended to the end of the current set of directory transfer tasks in the tasks key-value store 222. To transfer the content of any newly created files (currently absent file content), a new file transfer task is generated. In FIG. 2, the current set of file transfer tasks is represented in the tasks key-value store as file transfer tasks 226(1)-226(y). Note that as described herein with respect to FIG. 5, because the content is to be transmitted, a number of file transfer operations for smaller files can be combined to reduce the number of total file content transmissions, for efficiency. For example, there can be one file transfer task per one large file, or one file transfer task per some group of multiple smaller files.

Figure 3A:
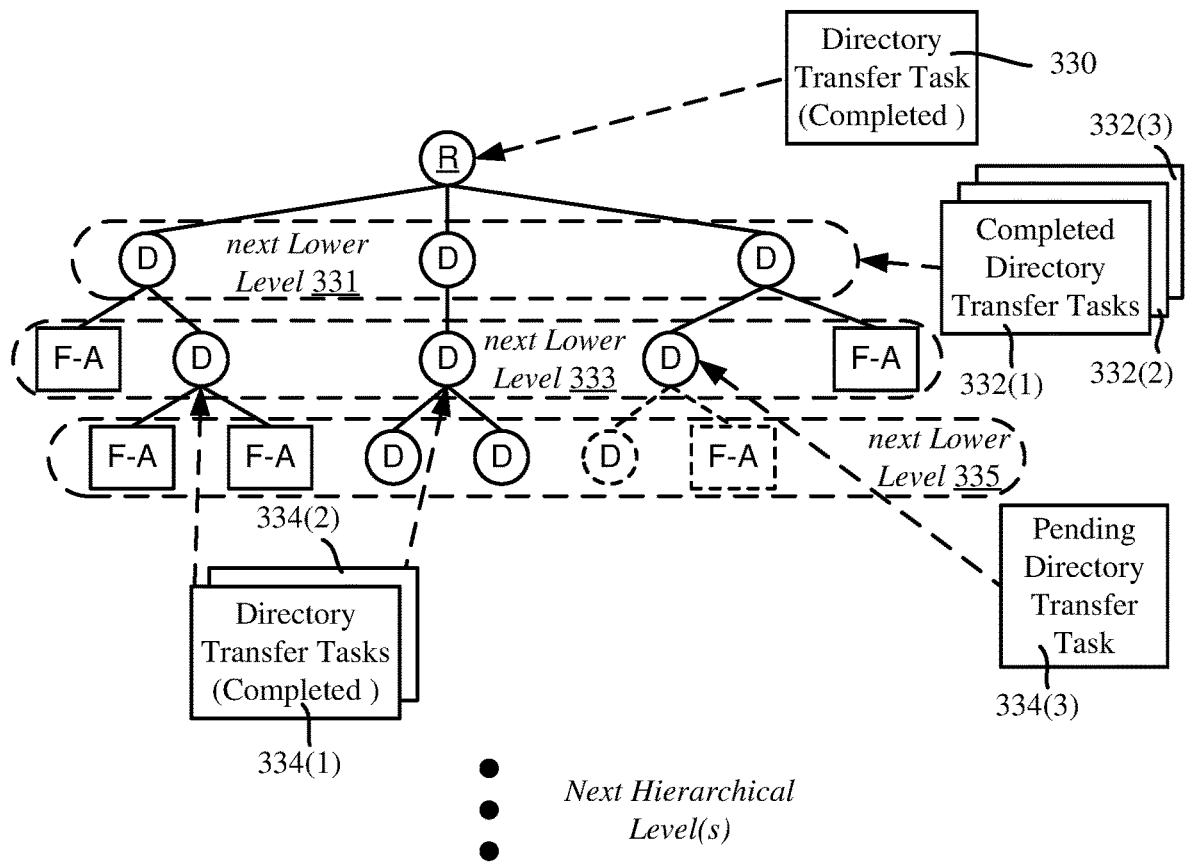
FIGS. 3A and 3B illustrate a hierarchical filesystem namespace when partially built (FIG. 3A) with directories and files (representations without content), and when the namespace is built with fill content still being added (FIG. 3B), in accordance with various aspects and implementations of the subject disclosure.

FIG. 3A shows a partially created namespace on the target filesystem, under some appropriate root directory R. As can be seen in this simplified filesystem example, a first directory transfer task 330 creates the root directory and its immediate children at a next lower level, which in this example are the three directories "d" at the next lower level 331 in the hierarchy. Each of those child directories result in one new directory transfer task being generated at the source system, that is, one new directory transfer task per child directory, (three more directory transfer tasks total for this level). Such directory transfers can be concurrent, e.g., one request to each target node, for generally parallel execution. Note that in this example, there are no child files of the root directory at this level 331, although any practical number of files as well as directories may be present in other examples.

When a directory transfer task is executed on a source cluster and creates empty files/directories on the target, each "create" can involve a network round trip between the source and target, with possibly large latency overhead. To avoid the expense of such latency for every operation, multiple creates can be sent in a single request; multiple acknowledgments can likewise be combined. Thus, directory transfer tasks can be sent in bulk requests to the target to reduce latency overhead, that is, bulk operations can be used to make namespace creation more efficient by reducing the total number of time-consuming round trips to the target.

In turn, each of the newly created directory transfer task are picked up and sent as requests to the target nodes to create the next level 333. In this next level 333, the first (leftmost represented) directory at the level 331 has a file and a single subdirectory created as its immediate children (blocks 332(1)-332(3)), as does the last (rightmost represented) directory at the level 333. The files are each represented as "F-A" to indicate that each file has been created, but the file content is absent (for now). As before, the source cluster also generated new directory transfer tasks (blocks 334(1)-334(3)) for each directory at this level 333, which, when received and processed at the target, will result in the next lower level 335 being created at the target. Note that in this example, two of the directory transfer tasks (blocks 334(1) and 334(2)) have completed, but the third (block 334(3)) is still pending (for whatever reason such as a transmission problem or heavily loaded target node), as represented by the dashed circle "d" and "F-A" at the next lower level 335. As a result, the parent directory exists at the higher level 335, but the children have not yet been created; there is thus the possibility of an error if the directory represented by the dashed circle "d" has any children and a directory transfer task is obtained at the target node that would attempt to populate that not-yet-created directory with a child. An acknowledgement ("ack") for each completed directory transfer task can be used to prevent such an error, that is, do not send (or alternatively do not process at the target) a directory transfer task until the parent directory transfer task has completed successfully.

As can be seen from the example of FIG. 3A, along with being concurrent, directory transfer tasks are recursive in their nature by creating further directory transfer tasks for their child directories, and so on for child directories of those child directories. In this way, the hierarchical namespace can be efficiently built, e.g., level by level, one directory's immediate children at a time as soon as that directory has been created as the parent.

Figure 3B:
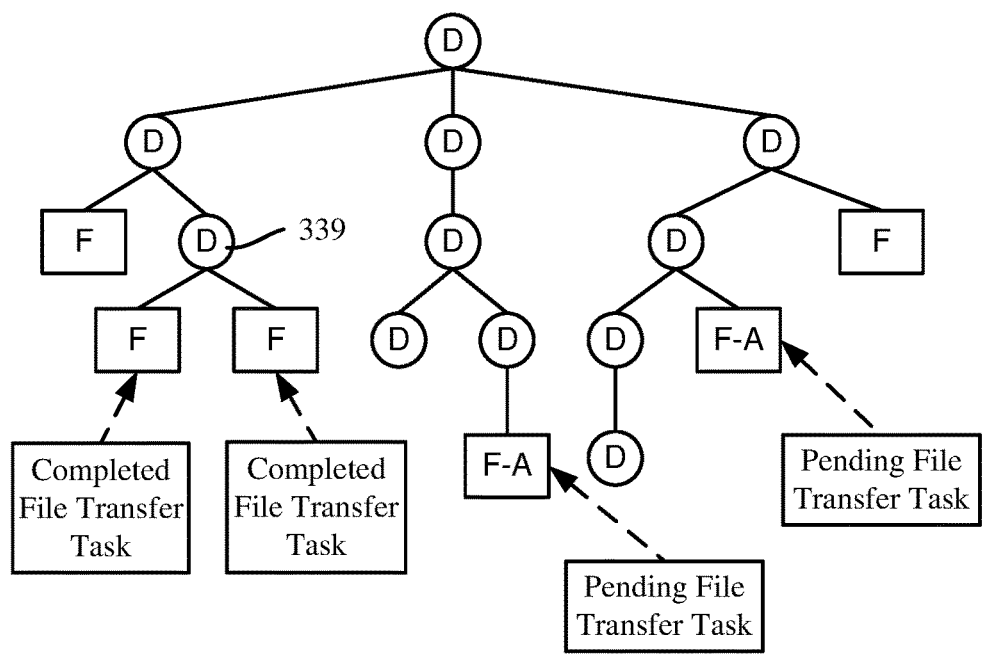

Once the hierarchical namespace is completely built (FIG. 3B), the file transfer tasks can be sent as requests for processing by the target nodes. In general, a file transfer tasks transfer the content of one or multiple files that have been previously created on the target. When a file transfer task has completed, the file or multiple files of that task have had their corresponding content written to the file (a file reference can now be used to access its content). When all file transfer tasks are complete (e.g., with an "ack" returned to ensure proper receipt and processing), the replication is finished.

Thus, one way to accomplish the above replication is to defer handling of the file transfer tasks until the namespace is fully built, that is, there are no more directory transfer tasks to handle. It should be noted, however that alternatives to such total deferral can be used. As one non-limiting example, once a portion of the namespace is completed to the point that no two or more target nodes can cause namespace contention in that portion, the files in that portion can have their content transferred via file transfer tasks. Additional tracking can be used to recognize such situations, possibly along with grouping file transfer tasks by such portions.

Figure 4:
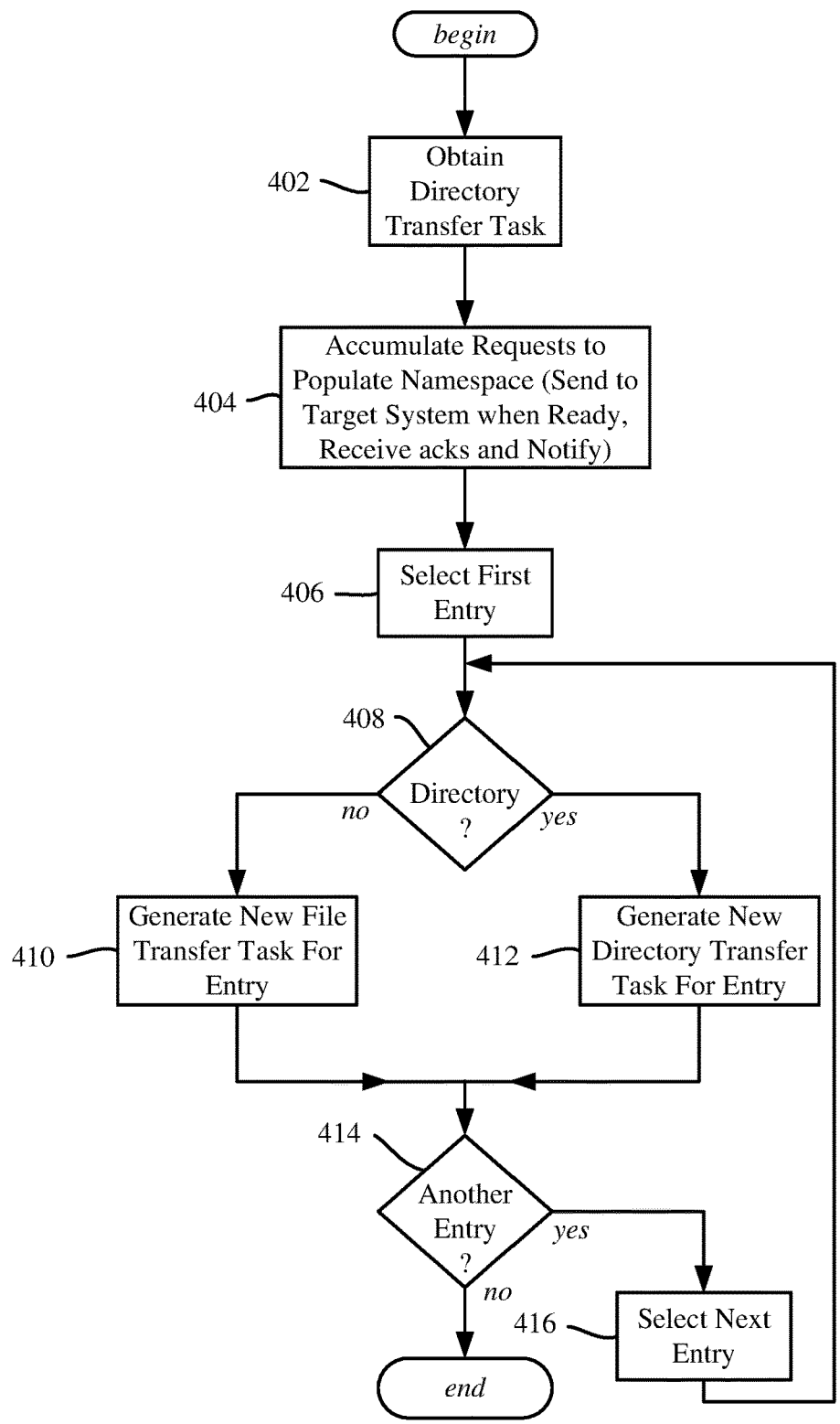
FIG. 4 is a flow diagram of example operations performed by a source node in handling a directory transfer task, in accordance with various aspects and implementations of the subject disclosure.

FIG. 4 is a flow diagram showing example operations that a source cluster node can perform with respect to handling a directory transfer task, beginning at operation 402 where the source node obtains the directory transfer task, e.g., by selecting the next directory transfer task from the sequential group of directory transfer tasks in the tasks key-value store. At operation 404, the data for this entry (e.g., the one or more file identifiers (IDs) or directory IDs) are added to a request to the target node to create the namespace portion represented by this entry. Note that it is feasible to simply wrap or otherwise prepare the existing directory transfer task into a (e.g., bulk) request for sending to the target, otherwise each entry made be separately added to the bulk request. When a sufficient number of requests have been accumulated, the bulk request will be sent to the target (not explicitly shown in FIG. 4), which (ordinarily, assuming no errors) is acknowledged by the target (e.g., after correct receipt and handling), and the source system notified in an appropriate way of the success with respect to this directory transfer task.

Operation 406 selects the first entry representing a child of an existing directory at the target, (although the first directory transfer task may be for the purpose of creating the root node and its children, whereby the first item can represent the root node to create). The entry needs to be evaluated (by operation 408 in this example) as to whether the entry represents a child file or child directory.

For a child file, operation 410 generates a new file transfer task, including appending that new task to the appropriate file transfer task location in the key-value store. For a child directory, operation 412 generates a new directory transfer task, similarly appending that new task to the appropriate directory transfer task location in the key-value store.

Operations 414 and 416 repeat the processing for any other entries in the selected directory transfer task until none remain.

Figure 5:
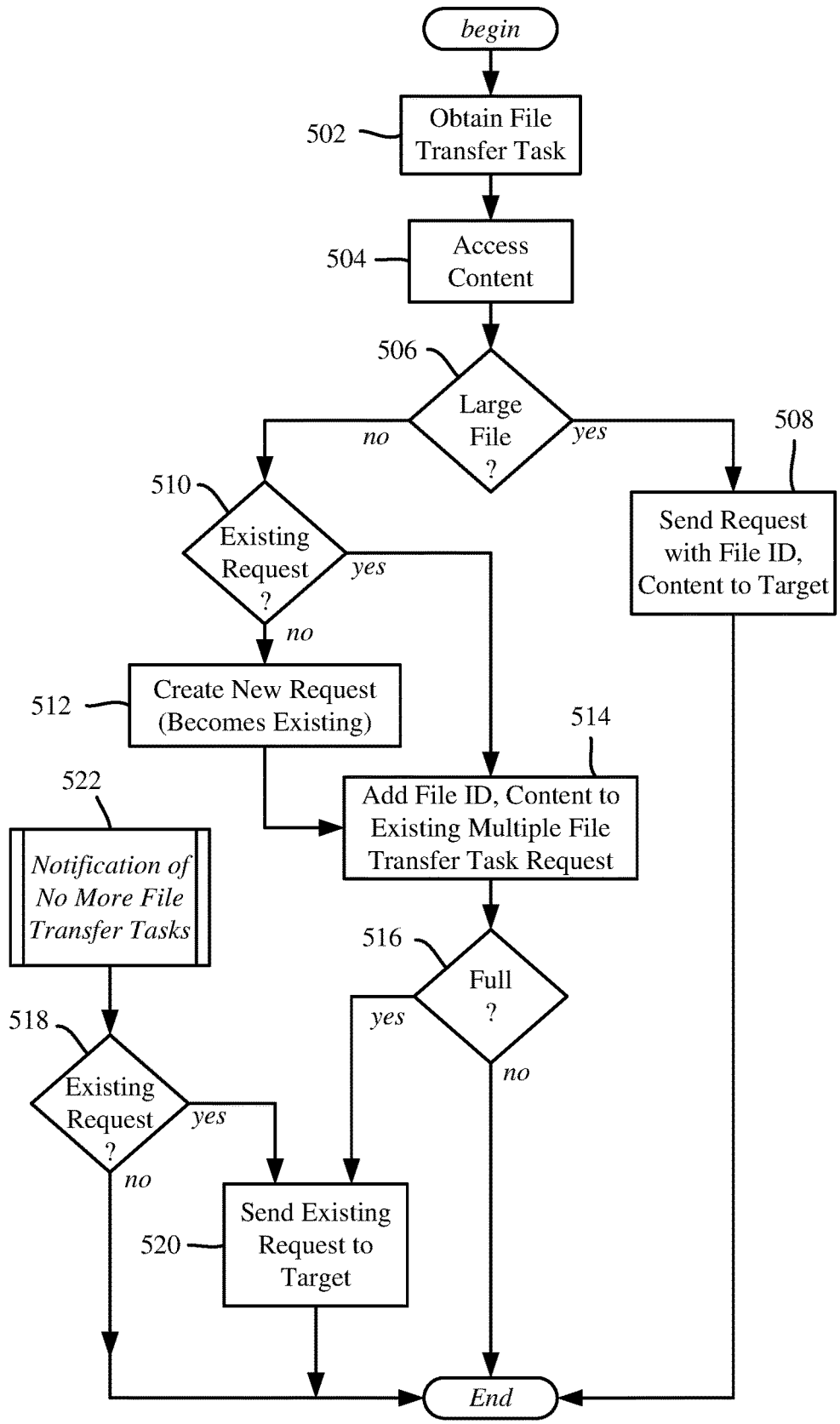
FIG. 5 is a flow diagram of example operations performed by a source node in handling a file transfer task, in accordance with various aspects and implementations of the subject disclosure.

FIG. 5 is a flow diagram showing example operations that a source cluster node can perform with respect to handling a file transfer task, beginning at operation 502 where the source node obtains the file transfer task, e.g., by selecting the next one from the sequential group of file transfer tasks in the tasks key-value store. Operation 504 represents accessing the content for this file, as well as the metadata therefor (e.g., the file size).

Operation 506 represents evaluating whether the file is a large file according to some size criterion, which may vary at times depending on network conditions, transfer protocols in use, and so on. In any event, for a large file, operation 508 sends the file content along with the file ID or the like to the target system.

For a small file, operation 510 evaluates whether there is an already started existing multiple file transfer task request.

If not, operation 512 creates a new multiple file transfer task request, which then becomes the existing multiple file transfer task request for use in sending the content for subsequent small files. Operation 514 adds the file ID and file content to the existing (which may have previously existed for one or more other files or just been created at operation 512) multiple file transfer task request.

Operation 516 evaluates whether the existing multiple file transfer task request is full, e.g., whether there is reasonable room for another small file, or whether the request has grown sufficiently large. If full, operation 520 sends the multiple file transfer task request to the target; a new multiple file transfer task will be created when operations 510 and 512 are performed for a next file transfer task for small file, assuming one is encountered.

In the event that there are no more file transfer tasks to process, a notification (block 522) or the like is received by each of the target nodes. If a node has an existing multiple file transfer task (operation 518), operation 520 sends the existing multiple file transfer request, e.g., even though it would otherwise have room for the content of at least one additional file, whereby the target system has been sent all of the content for which this node was responsible.

Figure 6A:
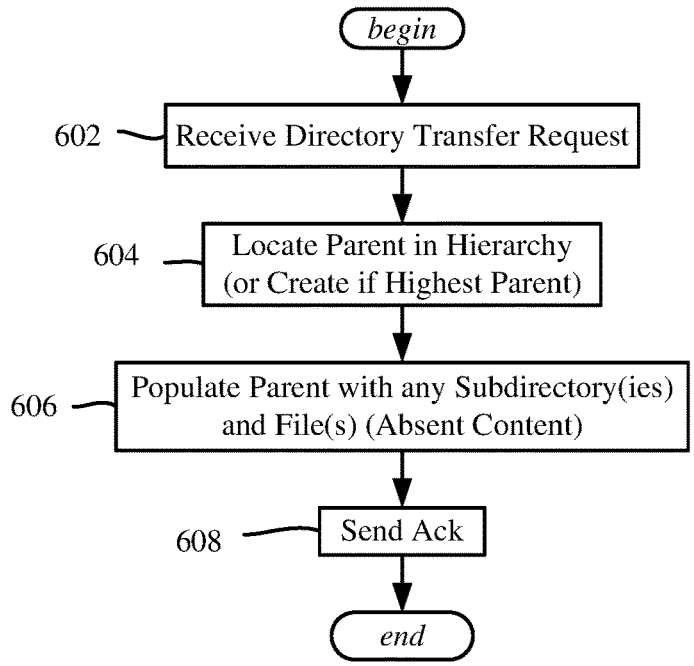
FIG. 6A is a flow diagram of example operations performed by a target node in handling a directory transfer task, in accordance with various aspects and implementations of the subject disclosure.

FIG. 6A represents example operations of a target node upon receipt of a directory transfer task request (operation 602). Operation 604 locates the parent in the hierarchy (which is identified in the request), and operation 606 populates the parent namespace with the child subdirectories (if any) and the child files, (if any), e.g., via create requests. Operation 608 sends an acknowledgment (which can be part of a bulk acknowledgment) to indicate when this directory transfer task request has been successfully handled. Note that operation 604 also represents creation of the parent root directory of the hierarchy in the event that this is the first directory transfer task request and no parent yet exists. It is alternatively feasible to set up the root/highest parent in initial communications between the source and the target in preparation for replication.

Figure 6B:
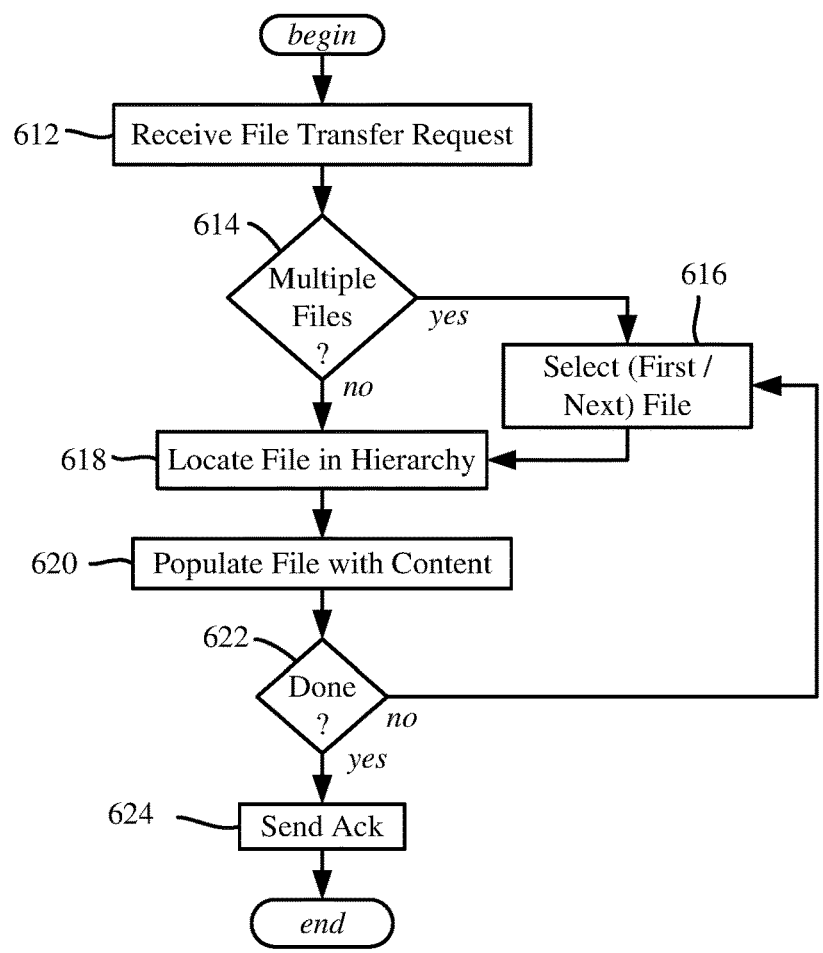
FIG. 6B is a flow diagram of example operations performed by a target node in handling a file transfer task, in accordance with various aspects and implementations of the subject disclosure.

FIG. 6B represents example operations of a target node upon receipt of a file transfer task request (operation 612). Operation 614 evaluates whether the request contains multiple files and their respective content, or is for a single file (e.g., large file), which if so, becomes the sole selected file to write into. For multiple files, operation 616 selects the next (initially the first) file in the transfer task.

Operation 618 represents locating the file in the hierarchy, e.g., by the file ID, and operation 620 populates (writes into) the file with the received content. If this was the last file (or the sole file for a single file), operation 622 branches to operation 624 to acknowledge the successful handling of this file transfer task. If at least one other file was not yet handled in a multiple file transfer task request, operation 622 returns to operation 616 to select that next file, and so on, until the file transfer task request has been completed handled.

Figure 7:
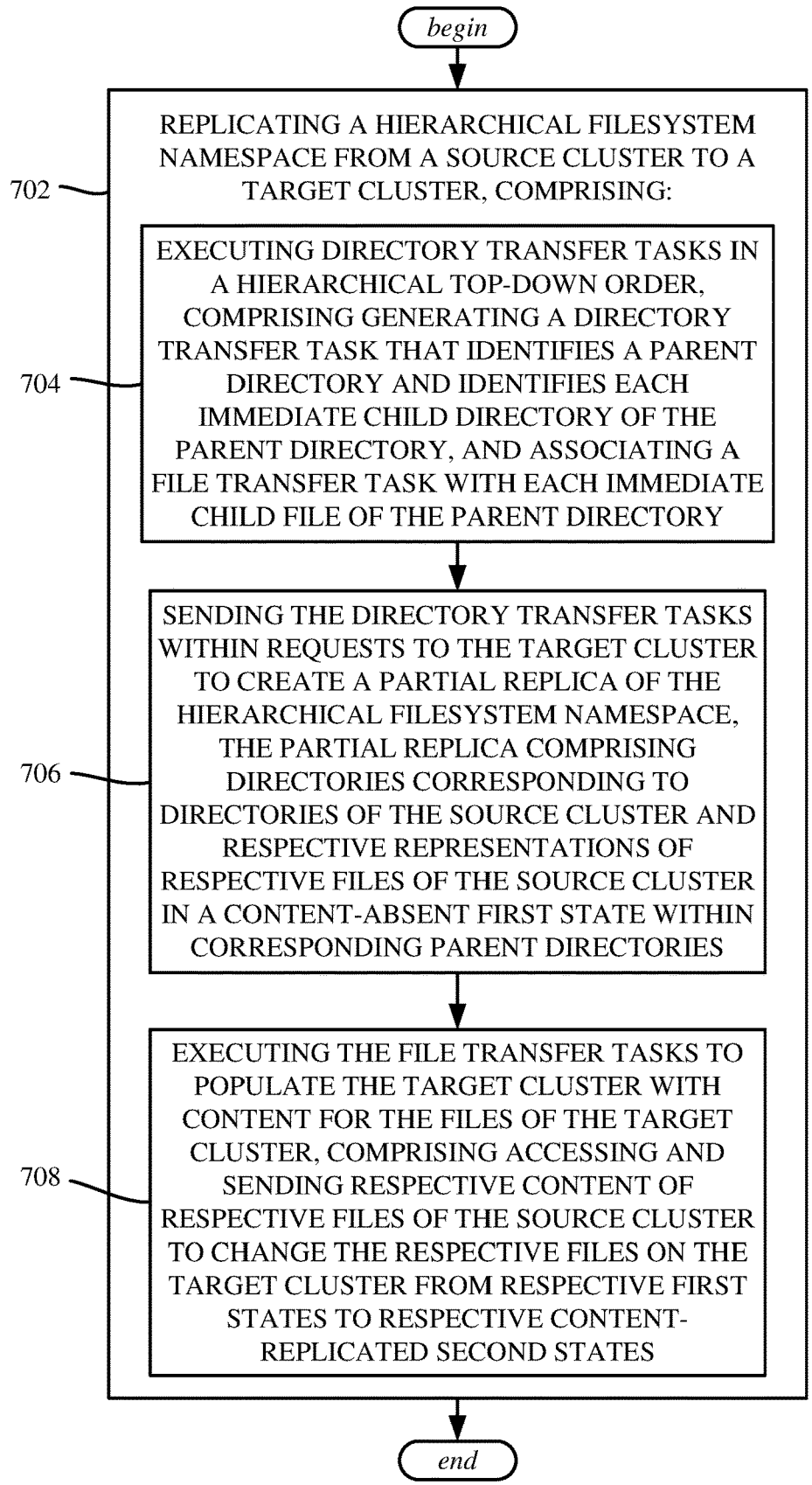
FIG. 7 is a flow diagram of example operations for handling directory transfer tasks and file transfer tasks when replicating a filesystem namespace from a source cluster to a target cluster, in accordance with various aspects and implementations of the subject disclosure.

One or more aspects can be embodied in network equipment and/or a system, such as represented in the example operations of FIG. 7, and for example can include a memory that stores computer executable components and/or operations, and a processor that executes computer executable components and/or operations stored in the memory. Example operations can include operation 702, which represents replicating a hierarchical filesystem namespace from a source cluster to a target cluster. The replicating can comprise operations 704, 706 and 708. Example operation 704 represents executing directory transfer tasks in a hierarchical top-down order, comprising generating a directory transfer task that identifies a parent directory and identifies each immediate child directory of the parent directory, and associating a file transfer task with each immediate child file of the parent directory. Example operation 706 represents sending the directory transfer tasks within requests to the target cluster to create a partial replica of the hierarchical filesystem namespace, the partial replica comprising directories corresponding to directories of the source cluster and respective representations of respective files of the source cluster in a content-absent first state within corresponding parent directories. Example operation 708 represents executing the file transfer tasks to populate the target cluster with content for the files of the target cluster, comprising accessing and sending respective content of respective files of the source cluster to change the respective files on the target cluster from respective first states to respective content-replicated second states.

Further operations can include combining at least two directory transfer tasks into a bulk request for the sending of the directory transfer tasks to the target cluster.

Associating the file transfer task with the child file can include generating the file transfer task in association with the child file.

Associating the file transfer task with the child file can include adding the file transfer task in association with the child file to an existing file transfer task.

Associating the file transfer task with the child file can include evaluating file size data of the child file with respect to size criterion data, in response to the file size data satisfying the file size criterion data, generating the file transfer task in association with the child file, and, in response to the file size data not satisfying the file size criterion data, adding the file transfer task in association with the child file to an existing file transfer task.

Executing the directory transfer tasks can include concurrently executing at least two of the directory transfer tasks.

Executing the file transfer tasks can include concurrently executing at least two of the file transfer tasks.

Executing the file transfer tasks can occur after the partial replica of the hierarchical filesystem namespace is created.

Further operations can include selecting a selected source node among a group of nodes of the source cluster, and executing a selected directory transfer task on the selected source node.

Further operations can include sending the selected directory transfer task via a request from the selected source node.

Figure 8:
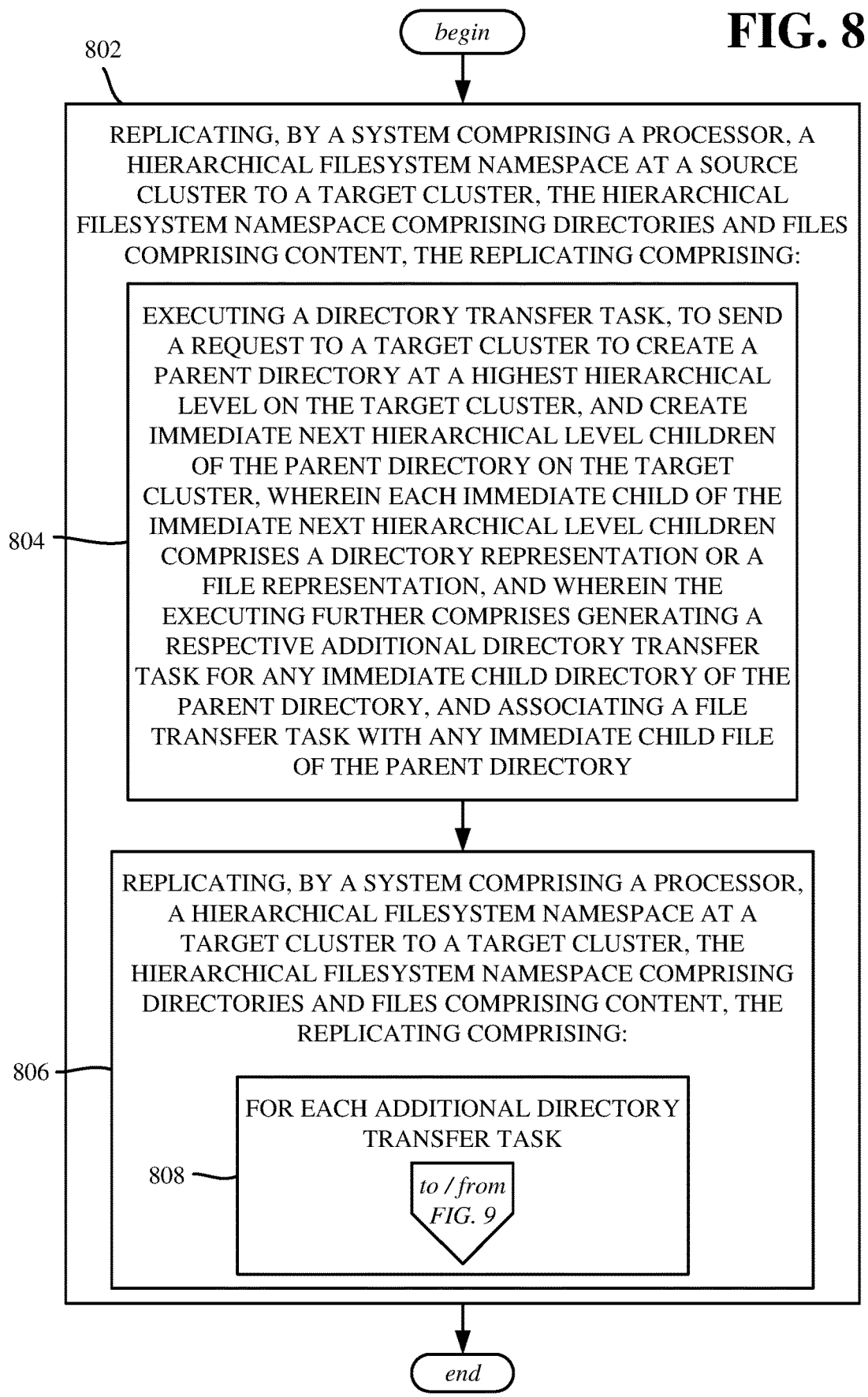
FIGS. 8 and 9 comprise a flow diagram of example operations for replicating a hierarchical filesystem namespace at a source cluster to a target cluster including via recursive handling of directory transfer tasks, in accordance with various aspects and implementations of the subject disclosure.
Figure 9:
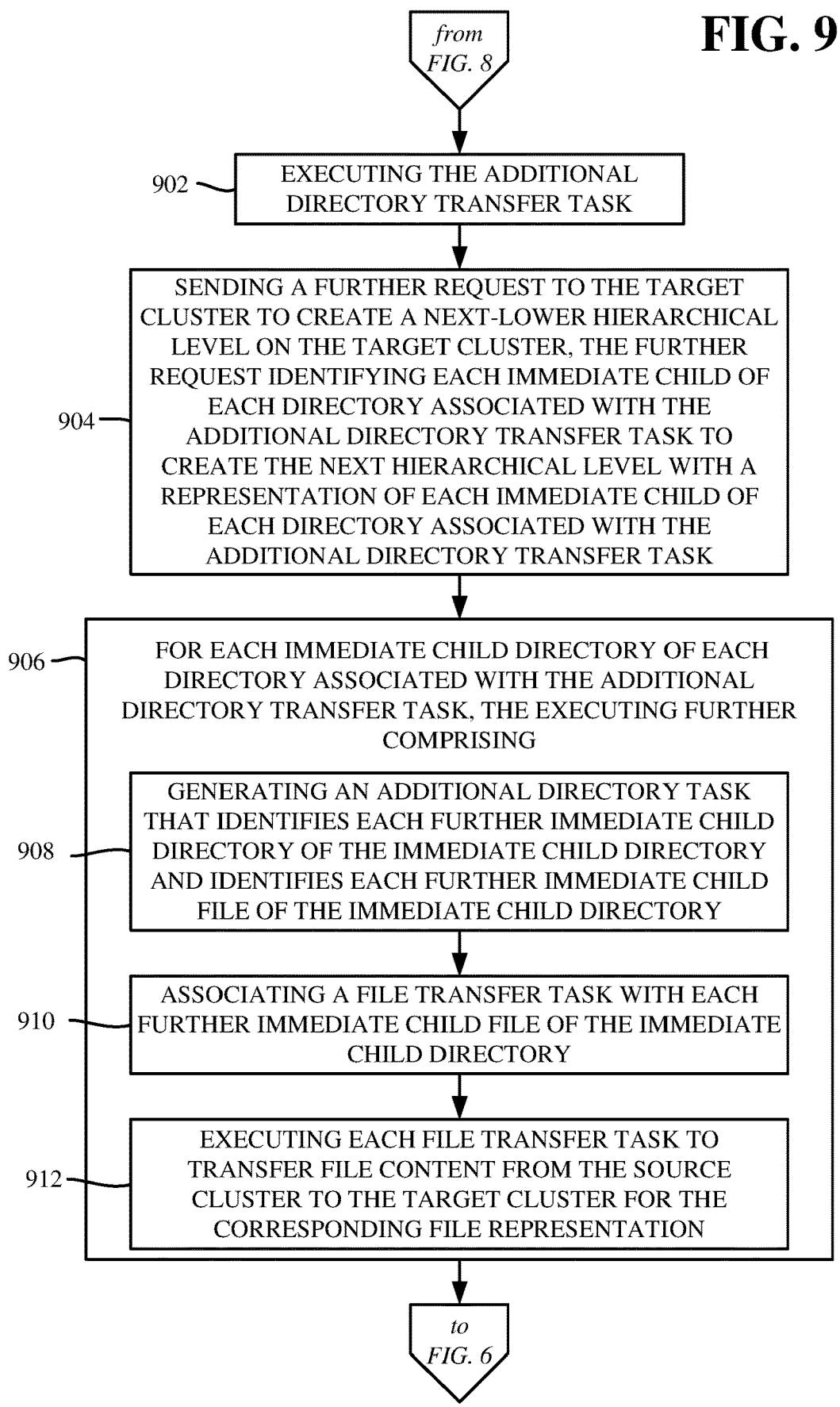

One or more example aspects, such as corresponding to example operations of a method, are represented in FIGS. 8 and 9. Example operation 802 of FIG. 8 represents replicating, by a system comprising a processor, a hierarchical filesystem namespace at a source cluster to a target cluster, the hierarchical filesystem namespace comprising directories and files comprising content, the replicating can comprise operation 804 and operation 806 (which includes operation 808). Example operation 804 represents executing a directory transfer task, to send a request to a target cluster to create a parent directory at a highest hierarchical level on the target cluster, and create immediate next hierarchical level children of the parent directory on the target cluster, wherein each immediate child of the immediate next hierarchical level children comprises a directory representation or a file representation, and wherein the executing further comprises generating a respective additional directory transfer task for any immediate child directory of the parent directory, and associating a file transfer task with any immediate child file of the parent directory. Example operation 806 represents recursively executing, until no additional directory transfer tasks remain to be executed, the additional directory transfer tasks, comprising, example operation 808 which represents for each additional directory transfer task, performing the operations of FIG. 9.

Example operation 902 represents executing the additional directory transfer task. Example operation 904 represents sending a further request to the target cluster to create a next-lower hierarchical level on the target cluster, the further request identifying each immediate child of each directory associated with the additional directory transfer task to create the next hierarchical level with a representation of each immediate child of each directory associated with the additional directory transfer task. Example operation 906 represents, for each immediate child directory of each directory associated with the additional directory transfer task, the executing further comprising operations 908, 910 and 912. Example operation 908 represents generating an additional directory task that identifies each further immediate child directory of the immediate child directory and identifies each further immediate child file of the immediate child directory. Example operation 910 represents associating a file transfer task with each further immediate child file of the immediate child directory. Example operation 912 represents executing each file transfer task to transfer file content from the source cluster to the target cluster for the corresponding file representation. The operations return to FIG. 8.

Sending the further request can be part of a bulk request comprising the further request and at least one other request.

Executing each file transfer task can occur after no additional directory transfer task remains to be executed.

Associating the file transfer task with each further immediate child file can include generating the file transfer task for an immediate child file.

Associating the file transfer task with each further immediate child file can include adding identification data and content of an immediate child file to an existing file transfer task.

Further operations can include selecting a selected source node from among a group of nodes of the source cluster, executing a selected directory transfer task on the selected source node, and sending the selected directory transfer task to the target cluster via a request from the selected source node.

Figure 10:
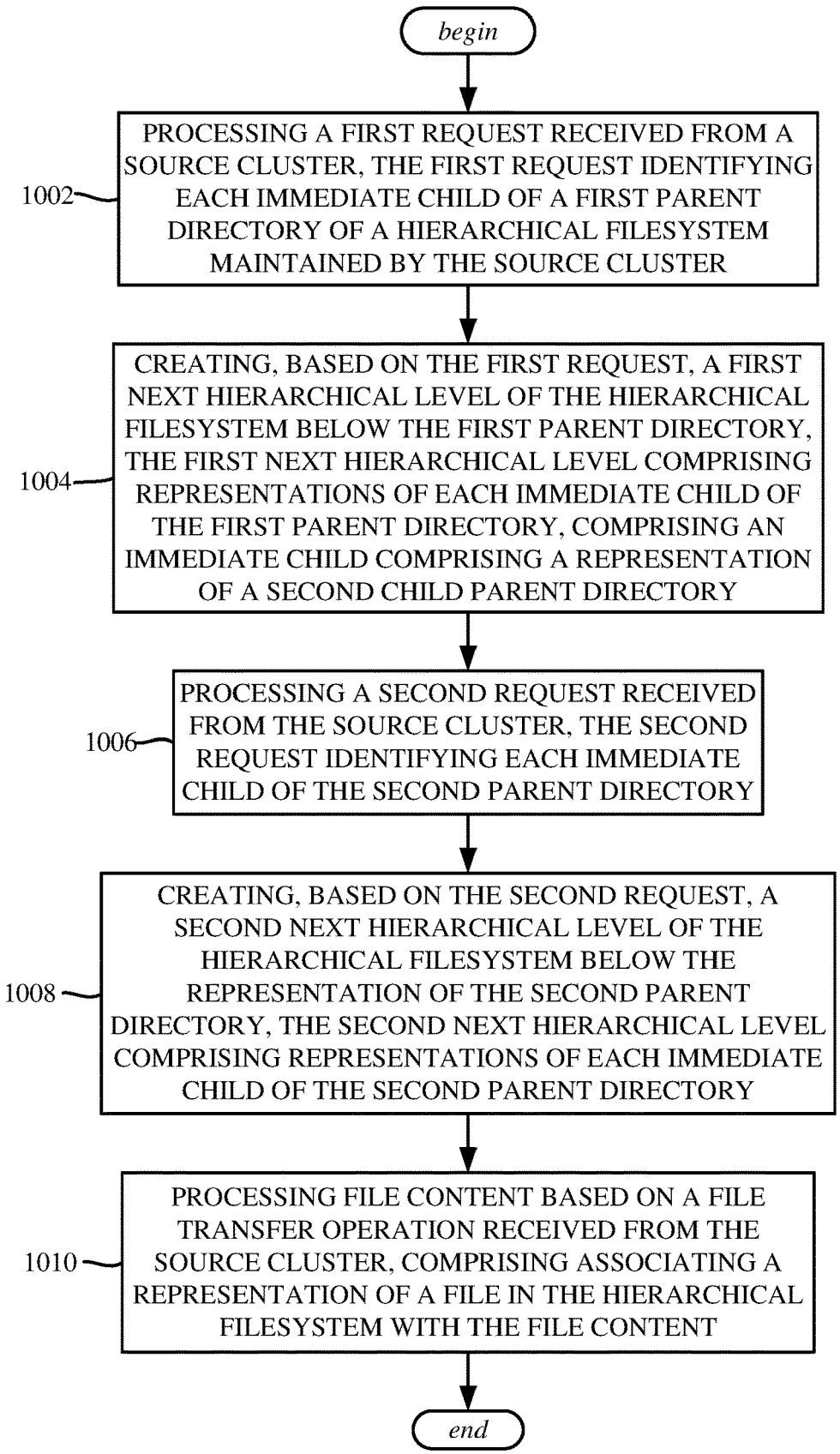
FIG. 10 is a flow diagram of example operations performed by a target system for replicating a source cluster filesystem at the target cluster, in accordance with various aspects and implementations of the subject disclosure.

FIG. 10 summarizes various example operations, e.g., corresponding to a machine-readable medium, comprising executable instructions that, when executed by a processor of a target cluster, facilitate performance of operations. Example operation 1002 represents processing a first request received from a source cluster, the first request identifying each immediate child of a first parent directory of a hierarchical filesystem maintained by the source cluster;

Example operation 1004 represents creating, based on the first request, a first next hierarchical level of the hierarchical filesystem below the first parent directory, the first next hierarchical level comprising representations of each immediate child of the first parent directory, comprising an immediate child comprising a representation of a second child parent directory;

Example operation 1006 represents processing a second request received from the source cluster, the second request identifying each immediate child of the second parent directory;

Example operation 1008 represents creating, based on the second request, a second next hierarchical level of the hierarchical filesystem below the representation of the second parent directory, the second next hierarchical level comprising representations of each immediate child of the second parent directory; and Example operation 1010 represents processing file content based on a file transfer operation received from the source cluster, comprising associating a representation of a file in the hierarchical filesystem with the file content.

Further operations can include processing a third request received from the source cluster, the third request identifying each immediate child of a third parent directory that is an immediate child of the second parent directory identified in the second request, and creating, based on the third request, a third next hierarchical level of the hierarchical filesystem below the representation of the second parent directory, the third next hierarchical level comprising a representation of each immediate child of the second parent directory. Further operations can include receiving the second request and the third request within a single bulk request transfer, and separating the second request from the third request for processing.

The file content can be first file content, wherein the file transfer operation can be a first file transfer operation, the representation of the file cab be a first representation of a first file in the hierarchical filesystem, and further operations can include receiving the first file transfer operation and a second file transfer operation in a single file transfer task, the single file transfer task comprising the first file content and the first file transfer operation, and second file content and a second file transfer operation, and processing the second file content based on the second file transfer operation, comprising associating a representation of the second file in the hierarchical filesystem with the second file content.

As can be seen, the technology described herein avoids namespace contention in the same directories during replication. By having tasks arranged to avoid namespace operations occurring in the same directory via different target nodes, the technology eliminates lock contention that otherwise causes replication performance degradation and client access degradation in the target directories. The technology described herein thus results in noticeable performance improvement, particularly with namespace-heavy customer datasets (e.g., on the order of billions of small files).

Figure 11:
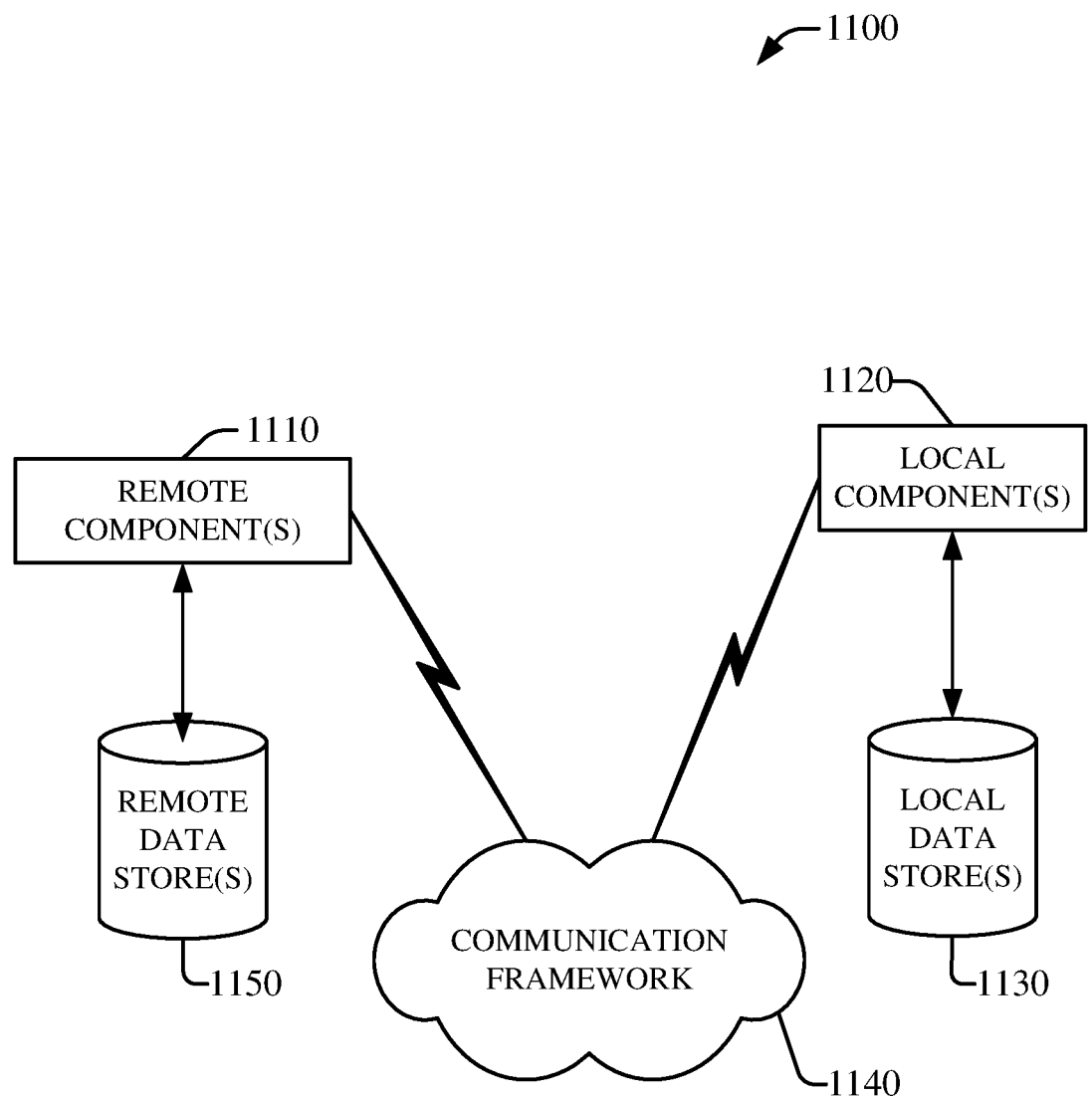
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
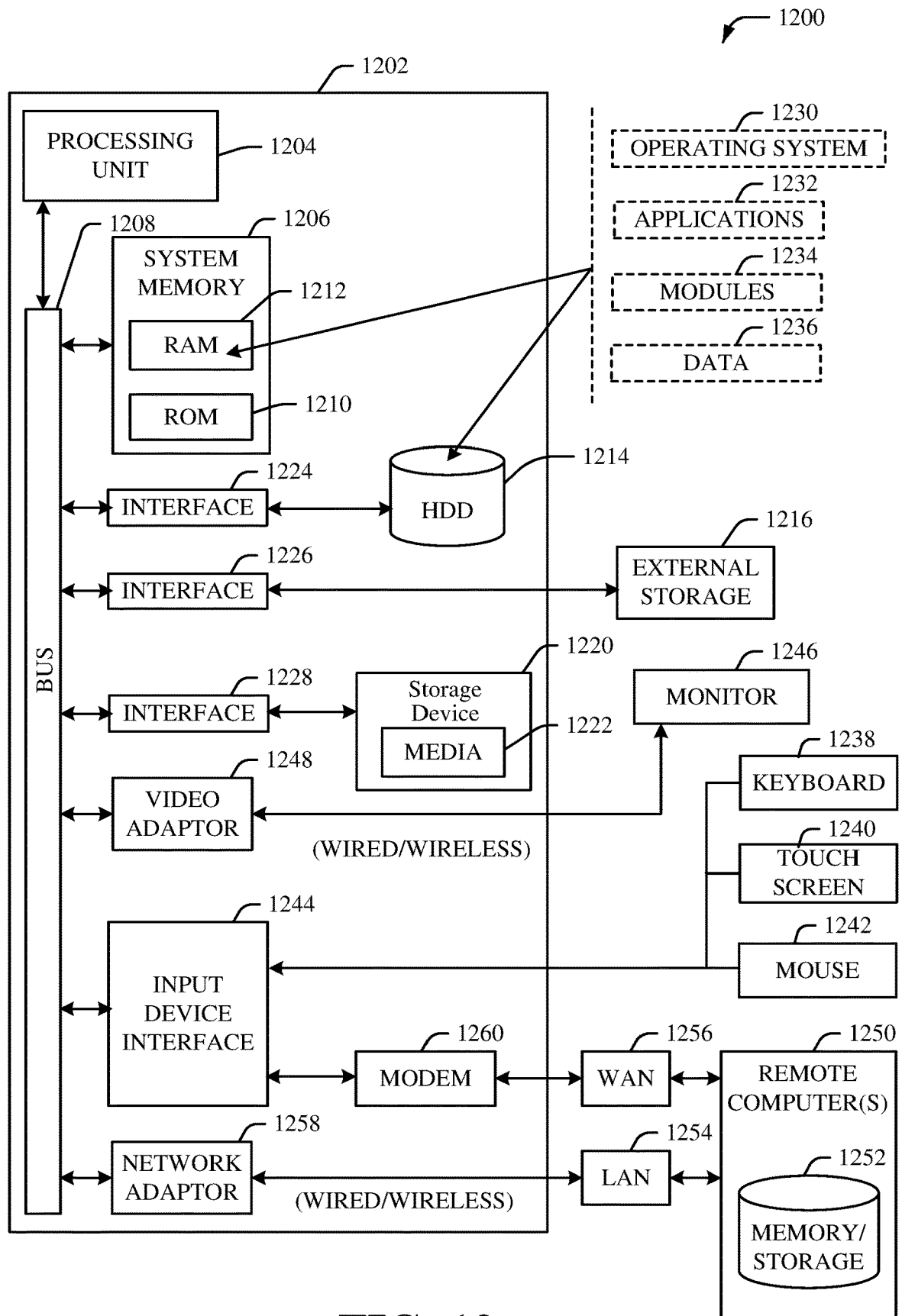
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   at least one processor; and
   at least one memory that stores executable instructions that, when executed by the at least one processor, facilitate performance of operations, the operations comprising:
   replicating a hierarchical filesystem namespace from a source cluster to a target cluster, the replicating comprising:
   executing directory transfer tasks in a hierarchical top-down order, comprising generating a directory transfer task that identifies a parent directory and identifies each immediate child directory of the parent directory, and associating a file transfer task with each immediate child file of the parent directory;

sending the directory transfer tasks within requests to the target cluster to create a partial replica of the hierarchical filesystem namespace, the partial replica comprising directories corresponding to directories of the source cluster and respective representations of respective files of the source cluster in a content-absent first state within corresponding parent directories; and in response to determining that the partial replica of the hierarchical filesystem namespace has been entirely created and determining that the partial replica of the hierarchical file system namespace has no namespace contention between the directories corresponding to the source cluster and the respective representations of the respective files of the source cluster in the content-absent first state within the corresponding parent directories within the partial replica, executing the file transfer tasks to populate the target cluster with content for the files of the target cluster, comprising accessing and sending respective content of respective files of the source cluster to change the respective files on the target cluster from respective content-absent first states to respective content-replicated second states.

2. The network equipment of claim 1, wherein the operations further comprise combining at least two directory transfer tasks into a bulk request for the sending of the directory transfer tasks to the target cluster.

3. The network equipment of claim 1, wherein the associating of the file transfer task with the child file comprises generating the file transfer task in association with the child file.

4. The network equipment of claim 1, wherein the associating of the file transfer task with the child file comprises adding the file transfer task in association with the child file to an existing file transfer task.

5. The network equipment of claim 1, wherein the associating of the file transfer task with the child file comprises evaluating file size data of the child file with respect to size criterion data, in response to the file size data satisfying the file size criterion data, generating the file transfer task in association with the child file, and, in response to the file size data not satisfying the file size criterion data, adding the file transfer task in association with the child file to an existing file transfer task.

6. The network equipment of claim 1, wherein the executing of the directory transfer tasks comprises concurrently executing at least two of the directory transfer tasks.

7. The network equipment of claim 1, wherein the executing of the file transfer tasks comprises concurrently executing at least two of the file transfer tasks.

8. The network equipment of claim 1, wherein the executing of the file transfer tasks occurs after the partial replica of the hierarchical filesystem namespace is created.

9. The network equipment of claim 1, wherein the operations further comprise selecting a selected source node among a group of nodes of the source cluster, and executing a selected directory transfer task on the selected source node.

10. The network equipment of claim 9, wherein the operations further comprise sending the selected directory transfer task via a request from the selected source node.

11. A method, comprising:

replicating, by a system comprising at least one processor, a hierarchical filesystem namespace at a source cluster to a target cluster, the hierarchical filesystem namespace comprising directories and files comprising content, the replicating comprising:

executing a directory transfer task, to send a request to a target cluster to create a parent directory at a highest hierarchical level on the target cluster, and create immediate next hierarchical level children of the parent directory on the target cluster, wherein each immediate child of the immediate next hierarchical level children comprises a directory representation or a file representation, wherein the executing further comprises generating a respective additional directory transfer task for any immediate child directory of the parent directory, and associating a file transfer task with any immediate child file of the parent directory, and wherein the file representation is empty of file content;

recursively executing, until no additional directory transfer tasks remain to be executed, the additional directory transfer tasks, comprising, for each additional directory transfer task, executing the additional directory transfer task, and sending a further request to the target cluster to create a next-lower hierarchical level on the target cluster, the further request identifying each immediate child of each directory associated with the additional directory transfer task to create the next hierarchical level with a representation of each immediate child of each directory associated with the additional directory transfer task, and, for each immediate child directory of each directory associated with the additional directory transfer task, the executing further comprising:

generating an additional directory task that identifies each further immediate child directory of the immediate child directory and identifies each further immediate child file of the immediate child directory, and associating a file transfer task with each further immediate child file of the immediate child directory;

determining that the generating of the additional directory task, which identifies the further immediate child directory of the immediate child directory and which identifies the further immediate child file of the immediate child directory, has concluded;

ensuring that no namespace contention exists between the further immediate child directory and the immediate child directory; and executing each file transfer task to transfer the file content from the source cluster to the target cluster for a corresponding file representation.

12. The method of claim 11, wherein the sending of the further request is part of a bulk request comprising the further request and at least one other request.

13. The method of claim 11, wherein the executing of each file transfer task occurs after no additional directory transfer task remains to be executed.

14. The method of claim 11, wherein the associating of the file transfer task with each further immediate child file comprises generating the file transfer task for an immediate child file.

15. The method of claim 11, wherein the associating of the file transfer task with each further immediate child file comprises adding identification data and content of an immediate child file to an existing file transfer task.

16. The method of claim 11, further comprising selecting, by the system, a selected source node from among a group of nodes of the source cluster, executing a selected directory transfer task on the selected source node, and sending the selected directory transfer task to the target cluster via a request from the selected source node.

17. A non-transitory machine-readable medium, comprising executable instructions that, when executed by at least one processor of a target cluster, facilitate performance of operations, the operations comprising:
    processing a first request received from a source cluster, the first request identifying, in a top down hierarchical order, each immediate child of a first parent directory of a hierarchical filesystem maintained by the source cluster;
    creating, based on the first request, a first next hierarchical level of the hierarchical filesystem below the first parent directory, the first next hierarchical level comprising representations of each immediate child of the first parent directory, comprising an immediate child comprising a representation of a second child parent directory;
    processing a second request received from the source cluster, the second request identifying each immediate child of a second parent directory;
    creating, based on the second request, a second next hierarchical level of the hierarchical filesystem below the representation of the second parent directory, the second next hierarchical level comprising representations of each immediate child of the second parent directory; and
    in response to determining that the creating of the first next hierarchical level of the hierarchical filesystem below the first parent directory, and the creating of the second next hierarchical level of the hierarchical filesystem below the representation of the second parent directory, have concluded, and further in response to determining that there is no namespace contention between the first next hierarchical filesystem below the first parent directory and the second next hierarchical level of the hierarchical filesystem below the representation of the second parent directory, processing file content based on a file transfer operation received from the source cluster, comprising associating a representation of a file in the hierarchical filesystem with the file content, wherein the representation of the file, prior to the processing of the file content, is empty of content.

18. The non-transitory machine-readable medium of claim 17, wherein the operations further comprise processing a third request received from the source cluster, the third request identifying each immediate child of a third parent directory that is an immediate child of the second parent directory identified in the second request; and
    creating, based on the third request, a third next hierarchical level of the hierarchical filesystem below the representation of the second parent directory, the third next hierarchical level comprising a representation of each immediate child of the second parent directory.

19. The non-transitory machine-readable medium of claim 18, wherein the operations further comprise receiving the second request and the third request within a single bulk request transfer, and separating the second request from the third request for processing.

20. The non-transitory machine-readable medium of claim 17, wherein the file content is first file content, wherein the file transfer operation is a first file transfer operation, wherein the representation of the file is a first representation of a first file in the hierarchical filesystem, and wherein the operations further comprise receiving the first file transfer operation and a second file transfer operation in a single file transfer task, the single file transfer task comprising the first file content and the first file transfer operation, and second file content and a second file transfer operation, and processing the second file content based on the second file transfer operation, comprising associating a representation of the second file in the hierarchical filesystem with the second file content.

* * * * *